DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 342

T875,011
POLYESTERS OF 2,6-NAPHTHALENDI-CARBOXYLIC ACID

John R. Caldwell and Russell Gilkey, both of P.O. Box 511, Kingsport, Tenn. 37662

Continuation of application Ser. No. 704,991, Feb. 13, 1968. This application Dec. 8, 1969, Ser. No. 880,466
Int. Cl. C08g *17/08*
U.S. Cl. 260—75
No Drawing. 14 Pages Specification

Highly polymeric, linear polyesters having improved hardness, solubility, and crystallization tendencies and which are useful as films, fibers, and molded objects are prepared from 2,6-naphthalenedicarboxylic acid and 2,2-dialkyl-1,3-propanediols (such as neopentyl glycol).